(12) United States Patent
Raiser

(10) Patent No.: US 6,720,098 B2
(45) Date of Patent: Apr. 13, 2004

(54) COMPRESSOR ARRANGEMENT FOR THE OPERATION OF A FUEL CELL SYSTEM

(75) Inventor: Stephen Raiser, Egelsbach (DE)

(73) Assignee: General Motors Corporation, Detroit, MI (US)

(*) Notice: Subject to any disclaimer, the term of this patent is extended or adjusted under 35 U.S.C. 154(b) by 124 days.

(21) Appl. No.: 10/047,009

(22) Filed: Jan. 15, 2002

(65) Prior Publication Data

US 2002/0187373 A1 Dec. 12, 2002

Related U.S. Application Data

(63) Continuation-in-part of application No. 09/859,176, filed on May 16, 2001, now abandoned.

(51) Int. Cl.⁷ ............................................... H01M 8/04
(52) U.S. Cl. ........................................ 429/13; 417/312
(58) Field of Search ........................... 180/65.3; 429/23, 429/33, 13; 417/312, 313, 234

(56) References Cited

U.S. PATENT DOCUMENTS

| | | | | |
|---|---|---|---|---|
| 4,492,533 A | | 1/1985 | Tsuge | 417/372 |
| 4,729,722 A | * | 3/1988 | Toth | 417/312 |
| 5,678,647 A | * | 10/1997 | Wolfe et al. | 180/65.3 |
| 5,794,732 A | | 8/1998 | Lorenz et al. | 180/65.3 |
| 5,837,393 A | | 11/1998 | Okamoto | 429/20 |
| 5,981,096 A | | 11/1999 | Hornburg et al. | 429/17 |

FOREIGN PATENT DOCUMENTS

| | | |
|---|---|---|
| DE | 3111258 | 10/1982 |
| DE | 3831703 | 3/1990 |
| DE | 9201659.6 | 9/1992 |
| DE | 4322767 | 5/1995 |
| DE | 19701560 | 12/1998 |
| DE | 19635008 | 12/1999 |
| DE | 19955291 | 5/2000 |
| EP | 0503139 | 11/1991 |
| EP | 0360048 | 8/1999 |

OTHER PUBLICATIONS

Deutsches Patent—und markenamt, May 23, 2001 (German Search Report).

* cited by examiner

Primary Examiner—Randy Gulakowski
Assistant Examiner—M. Wills
(74) Attorney, Agent, or Firm—Cary W. Brooks

(57) ABSTRACT

A compressor arrangement for the operation of a fuel cell system, wherein a compressed air flow can be delivered from the compressor arrangement, which is driven by an electric motor, to the fuel cell system and wherein the compressor arrangement and optionally the electric motor are at least partly surrounded by a sound insulation, is characterized in that the sound insulation is permeable to air and is provided within a housing which at least partly surrounds the compressor and preferably also the electric motor, and in that at least a part of the air intake flow for the compressor arrangement can be directed through the air permeable sound insulation before it enters into the compressor inlet.

6 Claims, 4 Drawing Sheets

COMPRESSOR ARRANGEMENT FOR THE OPERATION OF A FUEL CELL SYSTEM

RELATED APPLICATION

This is a continuation-in-part of U.S. patent application Ser. No. 09/859,176 filed May 16, 2001, and assigned to the assignee of the present invention, now abandoned.

TECHNICAL FIELD

The present invention relates to a compressor arrangement for the operation of a fuel cell system, wherein a compressed air flow can be supplied from the compressor arrangement, which is driven by an electric motor, to the fuel cell system and wherein the compressor and optionally the electric motor is at least partly surrounded by a sound insulation. The present invention also relates to a method for the cooling and/or sound insulation of a compressor arrangement provided for the operation of a fuel cell system and/or of at least one device associated with the fuel cell system and/or of an electric motor driving the compressor arrangement.

BACKGROUND OF THE INVENTION

The need exists, particularly when using fuel cells in a power unit for motor vehicles, to provide a compact construction and also to keep the weight of the unit and also the noise produced as low as possible by suitable measures. The compressor which delivers compressed air to the fuel cell system forms one of the main noise sources. When using hydrogen as a fuel, the compressed air flow from the compressor is principally supplied to the actual fuel cells, i.e. to the stack. When using hydrocarbons as fuel, these must first be processed by reformation and various shift reactions into a synthesized hydrogen-rich gas for the actual fuel cells. Some of the devices which carry out the reformation and shift reactions must also be supplied with air in addition to the fuel cells, for which a compressor is likewise required. The designation fuel cell system is used here as a generic term, i.e. signifies, on the one hand, the fuel cell stack when driven by hydrogen, and also includes other devices requiring air when using a hydrocarbon as the fuel. The electric power required to drive of the electric motor is produced in operation by the fuel cells and supplied, after appropriate processing, to the electric motor.

Since the compressor is known to be the main noise source, it is normally provided with a sound insulation in order to keep the radiated noise as low as possible. The electric motor which drives the compressor also forms a source of noise and it is likewise known to provide this motor with a sound insulation. It is, however, problematic that the compressor and/or the electric motor and also further devices which radiate sound waves can only be encapsulated inadequately, because otherwise a build-up of heat occurs.

SUMMARY OF THE INVENTION

The object of the present invention is to design a compressor arrangement and also a method of the initially named kind such that a compact simplified construction results on the one hand and such that an effective and indeed improved noise attenuation is achieved on the other hand, without undesired heat build-up arising.

In order to satisfy this object provision is made, in accordance with a first variant of the invention, that the sound insulation is air permeable and is provided within a housing which at least partly surrounds the compressor and preferably also the electric motor and in that a part of the inlet air flow for the compressor arrangement can be directed through the air permeable sound insulation before it enters into the compressor inlet.

Through the design of the thermal insulation as an air permeable sound insulation and through the guidance of the air inlet flow for the compressor arrangement through the air permeable sound insulation before it enters the compressor inlet one succeeds in cooling the compressor arrangement, and optionally also the electric motor which drives it, since the sucked-in environmental air first has to flow through the sound insulation surrounding the compressor arrangement and the electric motor before it enters into the compressor inlet. Since the environmental air has a temperature which lies significantly below the working temperature of the compressor arrangement and of the electric motor, an effective cooling of the compressor arrangement and/or of the electric motor can be achieved by this air guidance and one can at least partly dispense with cooling systems which operate with liquid coolant.

Furthermore, the compressor arrangement of the invention has the advantage that the sucked in air is preheated, which with cold environmental air wold otherwise require special preheating devices, which are now superfluous. Thus, with the subject of the invention, energy for the electrical preheating of air in winter is not unnecessarily wasted in contrast to the prior art.

With hotter environmental temperatures the invention admittedly leads to an unnecessary heating up of the environmental air, which reduces the performance of the compressor arrangement. However, it has been shown that this disadvantage can be tolerated, particularly since the efficiency of the compressor arrangement can be increased through the effective cooling thereof.

In accordance with a further variant of the present invention a compressor arrangement is provided for the operation of a fuel cell system comprising at least one device to be cooled which is associated with the fuel cell system, wherein a compressed air flow can be supplied from the compressor arrangement to the fuel cell system and also comprising a motor driving the compressor arrangement, in particular an electric motor, with the special characterization that the device(s) to be cooled and/or the compressor arrangement and/or the electric motor is or are accommodated in an air guiding duct or air guiding housing which leads to the compressor inlet.

Here, the invention provides that the sucked in environmental air can likewise be used to cool other devices of the fuel cell system which would otherwise have to be provided with liquid cooling. Such liquid cooling makes a large number of hoses and bypass lines necessary and ultimately increases the size of the radiator that is used and also of the energy required for the operation of the radiator, which in turn represents a loss of useful energy of the fuel cell system. Through the use of the inlet air flow for the cooling of such devices, i.e. of smaller and medium sized components, which represents assistance for the main cooling system, a simplification of the system takes place, since many hoses, bypass lines, valves, etc. become unnecessary. This also leads to a more compact construction, since the arrangement is simplified as a whole. Moreover, the forced venting of the sound insulated spaced associated with the special air guidance results in the reduction of the danger of local overheating. Since many hoses and bypass liens and also valves and devices for air preheating etc. can be dispensed with, not only is the spatial requirement and the weight of the unit reduced, but rather the reliability of the fuel cell system also increases.

When the sucked in air flow is used for the cooling of further devices of the fuel cell system, it is not absolutely essential to surround them with a sound insulation as well, in particular when they do not represent a significant source of noise. Nevertheless, a sound insulation can be sensible in order to ensure that a uniform flow of cooling air around the device takes place and to prevent air flowing past the devices itself forming a source of noise.

When a sound insulation is provided then this preferably has the form of an open-celled foam material and consists in particular of polyurethane foam. In this way, attention is paid to achieving an effective sound insulation with low inherent weight and adequate temperature resistance and that the pressure loss which arises is kept low. On the other hand, a foam material of this kind has adequate strength, so that it does not collapse under the suction pressure and so that the danger of parts of the foam material splitting off and entering into the compressor does not exist. Furthermore, the foam material acts as a type of filter and thus keeps contamination in the air flow away from the compressor inlet.

The sound insulation can also be realized by a metal braid or a random layer of metal similar to a pan scrubber consisting of metal ribbons which likewise act in an air permeable and sound insulating manner. Such metal structures have a high temperature resistance and, because they are thermally conducting, conduct heat away from the articles to be cooled and hereby enlarge the surface area which enters into contact with the air flow, whereby the efficiency of the cooling is improved.

Through the design of the air flow passage or air flow housing it can also be ensured that the cooling which arises is matched to the article to be cooled, i.e. takes place to an adequate degree where it is required. Methodwise, the invention is characterized in that the air inlet flow sucked in by the compressor arrangement is led through an air guiding duct or an air guiding housing past the devices(s) and/or the compressor arrangement and/or the electric motor before it enters into the compressor inlet.

Particularly preferred embodiments of the invention can be found in the subordinate claims.

BRIEF DESCRIPTION OF THE DRAWINGS

The invention will be explained in the following in more detail with reference to embodiments and to the drawings in which are shown.

DESCRIPTION OF THE PREFERRED EMBODIMENT

Figure 1:
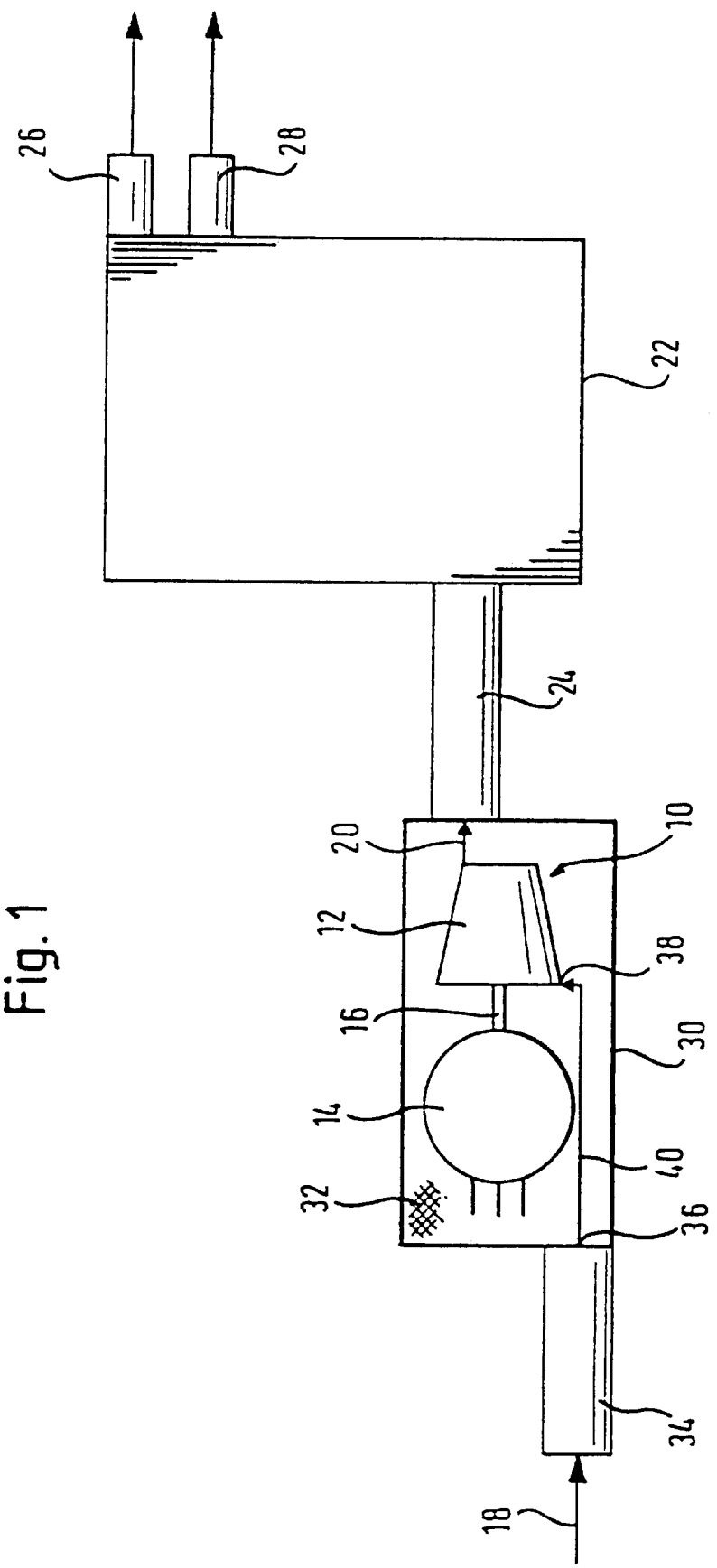
FIG. 1 is a basic design of the invention.

FIG. 1 shows a compressor arrangement 10 with a compressor 12 which is driven by an electric motor 14 via a shaft 16 and which sucks in an air flow 18 and delivers a compressed air flow 20 to a fuel cell system 22 through a silencer 24. The fuel cell system is realized in this embodiment as a fuel cell stack and has accordingly the usual outlets 26 and 28 for the cathode and anode exhaust gases which are further processed in a manner known per se.

The compressor 12 and the electric motor provided to drive the compressor are located within a housing 30 formed as an air guiding duct and filled with schematically illustrated foam material 32. That is, this foam material is located wherever free spaces are present within the housing 30. The foam material 32 is preferably an open-celled polyurethane foam material which is used in the air filters of normal motor vehicles and is thus well known.

The air which is sucked into the air filter or silencer 34 in accordance with the arrow 18 flows into the housing 30 at 36. It then flows through the air permeable foam material around the motor 14 and the compressor 12 and subsequently enters into the air inlet of the compressor 12, as schematically indicated by the arrow 38. This air guidance is schematically indicated by the line 40, it will be understood, however, that the air flows around units accommodated in the housing 30 through corresponding in-built air guiding features, so that these units are cooled in the desired manner before the inlet flow reaches the air inlet 38.

Figure 2:
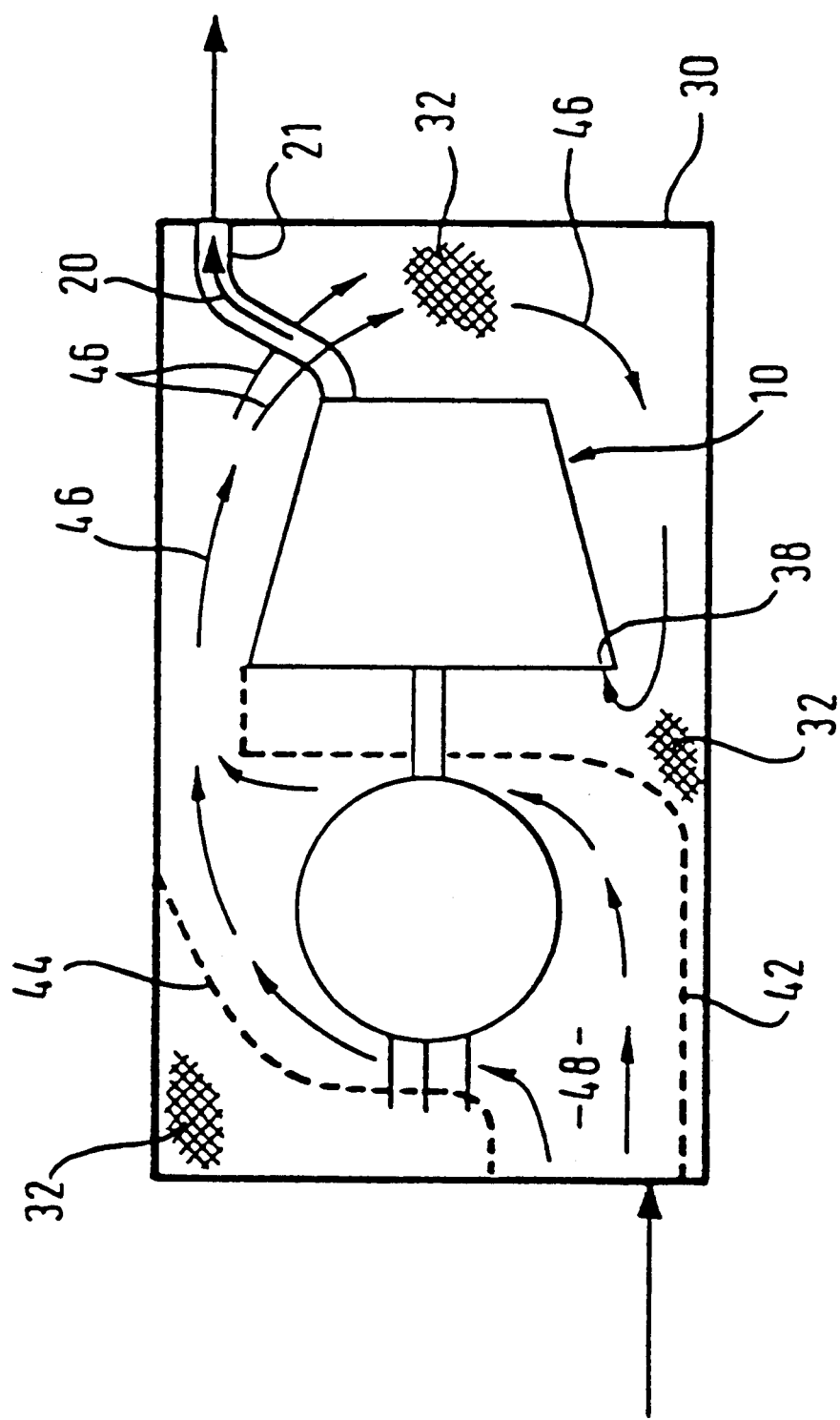
FIG. 2 is an enlarged representation of a part of the drawing of FIG. 1 in order to show a possibility for the air guidance in more detail.

FIG. 2 shows such in-built structures by way of example in broken liens in the form of possible sheet metal air guiding plates (or plastic webs) 42 and 44 respectively, which ensure that the air flows in accordance with the indicated arrows 46 around the motor 14 and the compressor 12 before the ingoing air enters into the air inlet 38 of the compressor 12. The sheet metal air guiding plates 42 and 44 thus form an air guiding duct 48. This is simply a schematic representation in order to explain the principle.

The air speed can be reduced and the heat take-up improved by the extended air flow through the housing 30 which arises in this way. Both the motor 14 and also the compressor 12 are cooled to an adequate degree and in exchange the air flow is preheated. As a result of the extended air flow through the foam material 32 which is present in the free spaces, at least within the air guiding duct 48 formed by the in-built structures 42 and 44, sound waves which propagate in this region are additionally attenuated.

Figure 3:
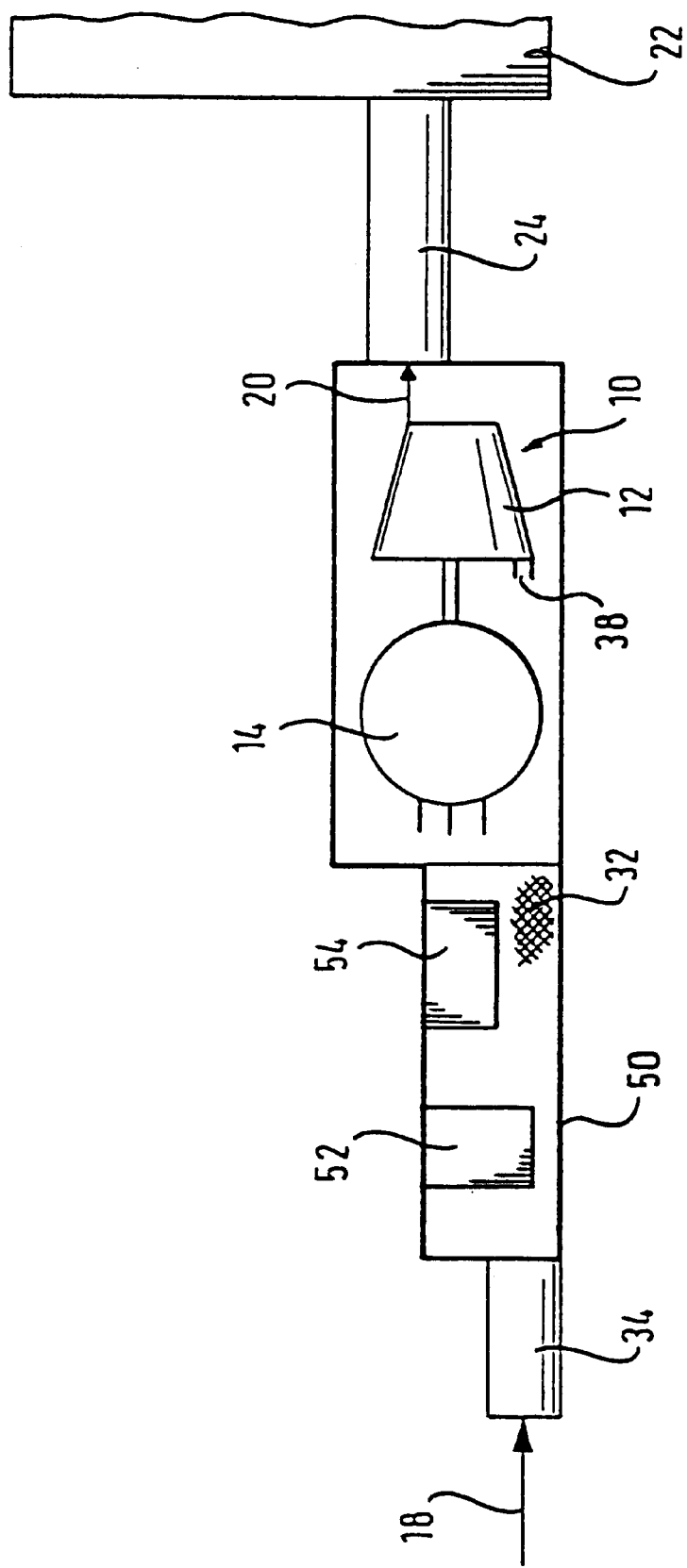
FIG. 3 is a further development of the invention.

FIG. 3 shows, likewise in schematic manner, how the principle of the invention can also be used for the cooling of other devices. The reference numerals which are used in FIG. 3 are the same ones that are to be found in FIGS. 1 and 2 and have the same meaning there, which is why they have not been separately been described. One can, however, see from FIG. 3 that the air guiding duct 48 has been extended through a region 50 in which two devices 52 and 54 are accommodated. The region located within the air guiding duct region 50 can also be filled with foam material 32. This is, however, not essential. In accordance with FIG. 3 the air (arrow 18) sucked in by the compressor 12 flows through the air filter or silencer 34 into the air guiding duct section 50 and flows there around the devices 52 and 54. It then passes as previously around the electric motor 14 and the compressor 12 and into its air inlet 38. After appropriate compression, the air flow leaves the compressor 12 as a compressed air flow 20 through the duct 21 (FIG. 2).

As a result of the cooling by the sucked in air flow it is no longer necessary to provide the devices 52 and 54 with liquid cooling, so that the corresponding lines, control valves, temperature sensors, etc., can be dispensed with.

The air filter or silencer 34 can also be omitted under some circumstances or realized by an exchangeable filter element which is arranged at the inlet of the air guiding section 50. The silencer 24 could also be omitted, if desired. Devices are normally also located between the outlet 20 of the compressor and the stack, for example for the humidifying of the air flow, so that a noise attenuation downstream of the compressor can also provide a contribution to noise reduction.

Figure 4:
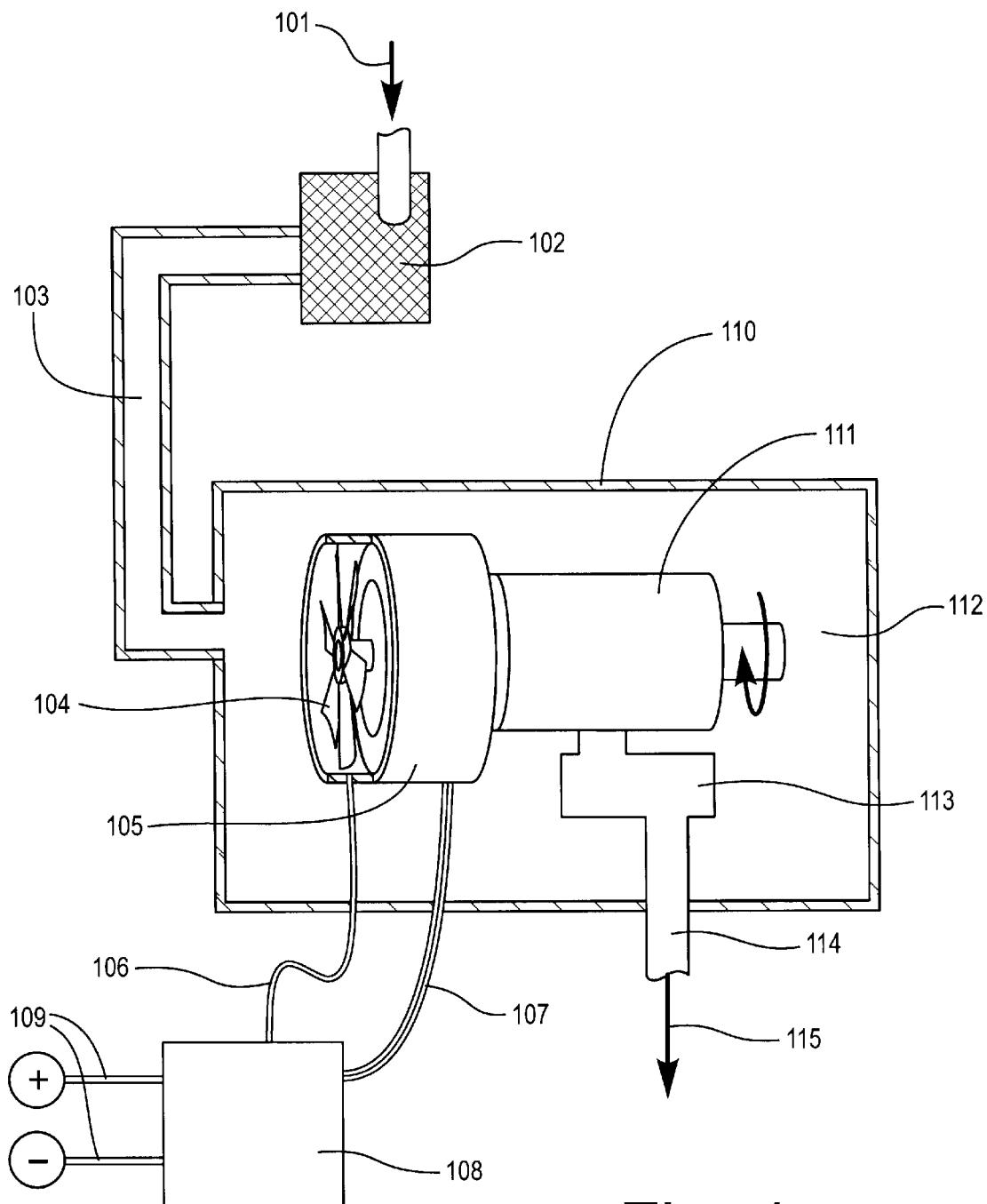
FIG. 4 is a schematic illustration of an alternative embodiment of the present invention.

FIG. 4 is a schematic illustration of an alternative embodiment of the present invention. The alternative embodiment includes the following components:

| | | |
|---|---|---|
| 101 | Inlet suction air from ambient | |
| 102 | Inlet air filter and muffler | (conventional ICE filter |
| 103 | Muffled inlet air tube | (silicon rubber with damping foam) |
| 104 | Fan mounted to the motor shaft | (part of e.g. Fisher motor) |
| 105 | Electric motor | (e.g. Fisher motor) |
| 106 | Motor sensor wire | (temperature + speed sensor) |
| 107 | Motor AC wires | (3 phase AC wires) |
| 108 | Motor electronic | (e.g. AMC controller) |
| 109 | HV DC terminals | (voltage from fuel cell) |
| 110 | Sound insulation box | (aluminum + adhesive damping foam |
| 111 | Air compressor | (e.g. Opcon OA 1050) |
| 112 | Compressor inlet suction air | (contains motor waste heat) |
| 113 | Compressor outlet muffler | (e.g. aluminum baffle box) |
| 114 | Compressed air outlet | (provides air for fuel cell system) |

The drawings are to be understood purely schematically in order to make the principle of the present invention clear.

What is claimed is:

1. A compressor arrangement for the operation of a fuel cell system, comprising a compressor having an intake air inlet, an electric motor for driving said compressor to deliver output air to the fuel cell system, a housing at least partly surrounding at least one of said compressor and said electric motor, and air permeable sound insulation within said housing and at least partly surrounding one of said compressor and said electric motor, said compressor arrangement being adapted for said intake air to pass through said air-permeable sound insulation before entering said compressor inlet, and wherein the sound insulation comprises at least one of braided metal and metal ribbons.

2. A compressor arrangement for the operation of a fuel cell system comprising a compressor having an intake air inlet, a motor for driving said compressor to deliver a compressed air flow to the fuel cell system, at least one device requiring cooling located in an air supply duct communicating with said air inlet for conveying said intake air in to said compressor inlet, and at least one, of said device, compressor or motor is located in said supply duct for cooling by said intake air, and said air supply duct contains air-permeable sound insulation through which said intake air flows, wherein said sound insulation comprises at least one of braided metal and metal ribbons.

3. A compressor arrangement in accordance with claim 1, wherein a sound insulation is provided upstream of said housing with respect to the direction of flow of said intake air.

4. A compressor arrangement in accordance with claim 2, wherein a sound insulation is provided upstream of said air supply duct with respect to the direction of flow of said intake air.

5. A compressor arrangement in accordance with claim 1, wherein said compressor has a compressor outlet and a sound insulation is provided between said compressor outlet and said fuel cell system.

6. A compressor arrangement in accordance with claim 2, wherein said compressor has a compressor outlet and a sound insulation is provided between said compressor outlet and said fuel cell system.

* * * * *